US012296346B2

(12) United States Patent
Wood

(10) Patent No.: US 12,296,346 B2
(45) Date of Patent: May 13, 2025

(54) MULTI-CONFIGURATION MINI JIG

(71) Applicant: Sidney A Wood, Wasilla, AK (US)

(72) Inventor: Sidney A Wood, Wasilla, AK (US)

( * ) Notice: Subject to any disclaimer, the term of this patent is extended or adjusted under 35 U.S.C. 154(b) by 0 days.

(21) Appl. No.: 18/745,130

(22) Filed: Jun. 17, 2024

(65) Prior Publication Data

US 2024/0416359 A1 Dec. 19, 2024

Related U.S. Application Data

(60) Provisional application No. 63/509,011, filed on Jun. 19, 2023.

(51) Int. Cl.
*B03B 5/16* (2006.01)
*B03B 5/24* (2006.01)

(52) U.S. Cl.
CPC . *B03B 5/16* (2013.01); *B03B 5/24* (2013.01)

(58) Field of Classification Search
CPC ................ B03B 5/16; B03B 5/10; B03B 5/24
USPC .......................................................... 209/269
See application file for complete search history.

(56) References Cited

U.S. PATENT DOCUMENTS 2,846,071 A * 8/1958 Richard .................... B03B 5/24 209/455
5,207,742 A * 5/1993 Scutt ....................... B03B 13/06 209/455
6,216,367 B1 * 4/2001 Tubbs ....................... B03B 5/62 209/477
8,443,981 B1 * 5/2013 Eldridge ................... B03B 5/16 209/159

* cited by examiner

*Primary Examiner* — Michael McCullough
*Assistant Examiner* — Jessica L Burkman

(57) ABSTRACT

A portable, modular mini mining jig can be configured as a single-stage jig with one or multiple jig cells, or as a multistage jig with one or multiple jig cells per stage. Due to the modular nature of the mini jig components, any number of jig cells and stages are possible. Adding jig cells and stages increases the throughput and capacity of the system, which increases efficiency.

20 Claims, 19 Drawing Sheets

MULTI-CONFIGURATION MINI JIG

PRIORITY CLAIM AND CROSS-REFERENCE TO RELATED APPLICATION

This application claims the benefit under 35 U.S.C. § 119(e)(1) of U.S. Provisional Application No. 63/509,011, filed Jun. 19, 2023, which is hereby incorporated by reference in its entirety.

BACKGROUND

While many who mine gold are looking for larger nuggets or flakes, fine gold can make up a larger percentage of available gold in placer deposits. Placer deposits are those that have been released from a larger gold deposit due to environmental effects (such as gold in a river or stream bed from erosion, etc.). Fine gold is generally considered to be the gold particles that are more difficult to pick up with hands or many tools (e.g., about one half of one millimeter or less in diameter).

However, fine gold can be extremely difficult to trap effectively. Sluice boxes and gold pans, for example, can be very inefficient at mining fine gold. Sluice boxes and similar mining methods separate material by size or by weight, but not both, and not efficiently. Much of the fine gold is combined with waste and is not captured.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

Figure 1:
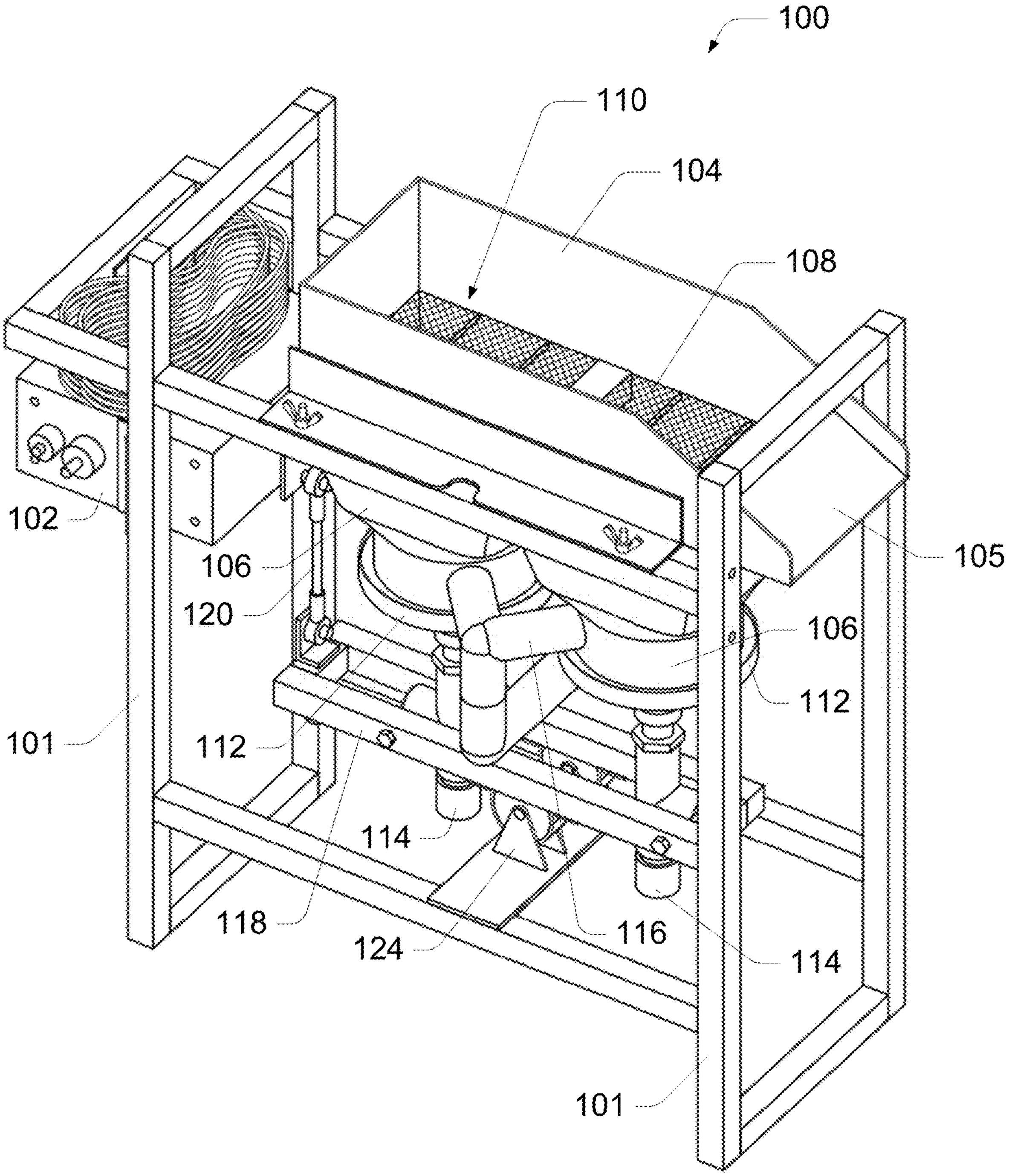
FIG. 1 is a top perspective view of an example single-stage duplex mini jig, according to an embodiment.
Figure 2:
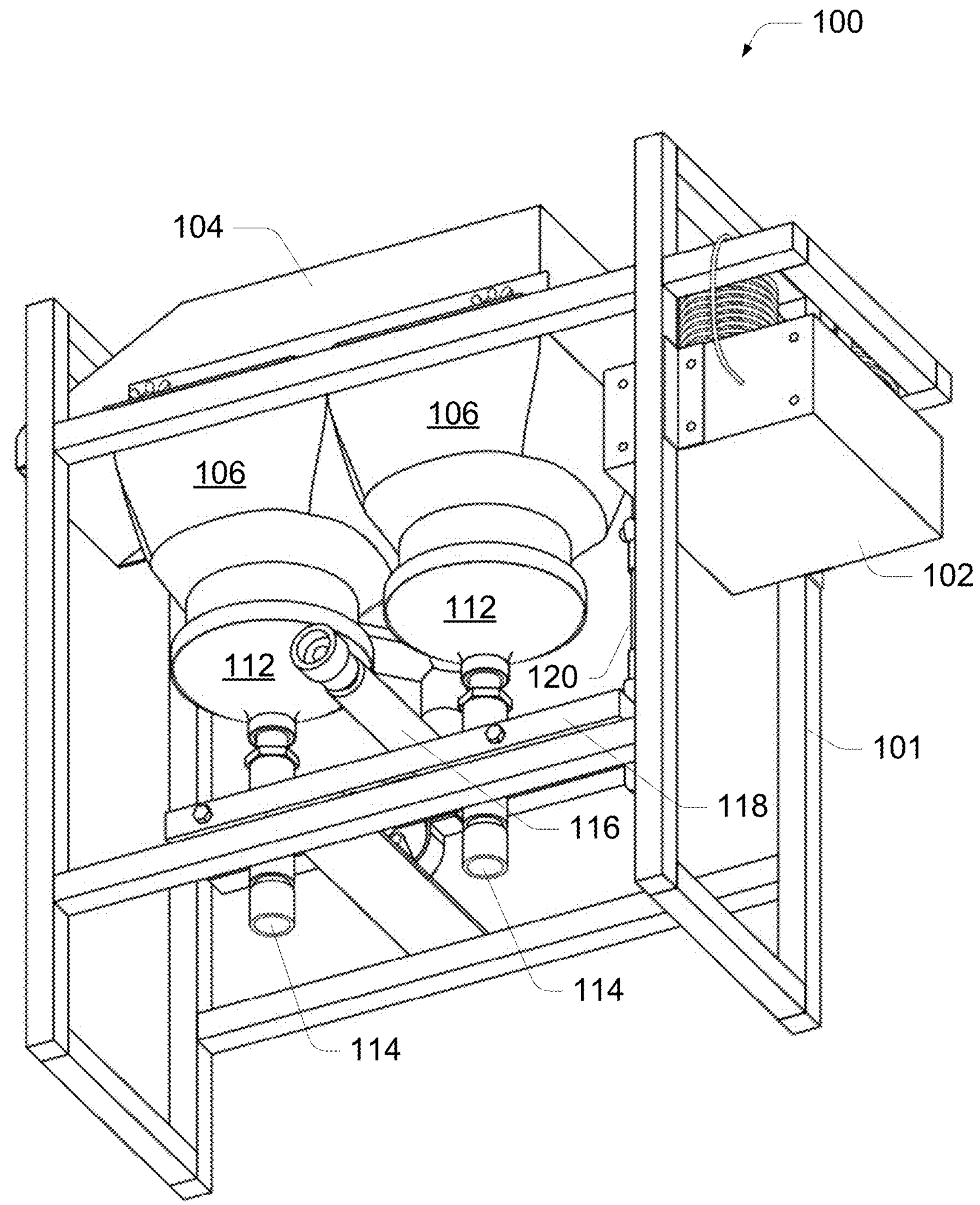
FIG. 2 is a bottom perspective view of an example single-stage duplex mini jig, according to an embodiment.

Referring to FIGS. 1-18, the document herein discloses example embodiments of a modular multi-configuration mini mining jig system (hereinafter "mini jig 100"). The mini jig 100 comprises a portable mining machine or system, which can be used to mine finely subdivided minerals, such as fine gold, from collected soil.

The modular characteristic of the mini jig 100 allows various configurations of portable mining jigs to be assembled or arranged using a set of common components and a few house-hold tools (one 7/16 inch open end wrench and one 3/16 inch hex wrench, for example).

For instance, the mini jig 100 can comprise a kit that includes the common components, and which can include a power supply (such as a battery), a water pump, and may also include the tools used for assembly. The mini jig 100 is designed to be small and lightweight, to allow a user to easily carry and deploy the mini jig 100 into remote environments that may be inaccessible to vehicles. For instance, in some cases, the mini jig 100 (including associated components of the kit) can be carried in a backpack or similar carrier to be carried by the user to a remote location.

The modular components of a mini jig 100 can be assembled or arranged into various arrangements: as a single-stage jig (see FIG. 1, for example), with one or two (or more) primary jig cells, or as a multi-stage jig (see FIG. 12, for example) with one or two (or more) jig cells per stage. Accordingly, a mini jig 100 arrangement can include one, two, or more stages, with one, two, or more jig cells per stage. In an embodiment, a mini jig 100 kit includes the components to assemble more than one arrangement of a mini jig 100, and may contain the components to assemble many arrangements.

Including FIGS. 1-18, the disclosure herein includes drawings, diagrams, flow charts, and descriptions of various embodiments of a mini jig 100. Dimensions and materials of components are non-limiting examples, unless otherwise specified. Other dimensions, materials, proportions, and specifications are also contemplated and are within the scope of the disclosure.

Mineral jigs such as the mini jig 100 can be efficient at trapping fine gold because unlike other types of gold mining equipment, mineral jigs separate material by size and specific gravity, and with much less water than other mining devices. Many other mining methods separate material either by size or by weight, but not both, and not efficiently. In some cases, mineral jigs can have less capacity (throughput) than sluice boxes, so most mineral jigs are large (to improve throughput), expensive, heavy, and loud.

Mineral jigs are manufactured as primary (large volume and rough screening), secondary (smaller capacity and fine screening), or tertiary (smallest volume and ultra-fine screening) gold recovery machines. Operating a tiered or multi-stage mineral jig system generally requires multiple high voltage motors and slurry pumps, at least one large water pump, and a high capacity generator. Even single mineral jigs commonly weigh several hundred pounds. A multi-stage system can weigh several tons.

The instant disclosure describes a solution in a truly portable, multi-stage mineral jig system. The modular mini jig 100 can be configured to perform as a single-stage, duplex, primary jig set, as a two-stage, duplex, secondary and tertiary jig set, or as a jig set with additional jig cells and/or stages. Due to the modular nature of the mini jig 100 components, any number of jig cells and stages are possible. Adding jig cells and stages increases the throughput and capacity of the system, which increases efficiency.

A modular mini jig 100 kit can include all the parts to reconfigure a mini jig 100 from a single-stage duplex arrangement (see FIG. 1, for example) to a two-stage arrangement (see FIG. 13, for example), or other arrangements. Kits can also include additional modular components that can be used to arrange a mini jig 100 in multiple configurations, if desired. Reconfiguration of a mini jig 100 by the user is simple and easy in the field using the modular components and just a few tools.

In an example, the frame of a mini jig 100 can be comprised of aluminum (or other metal, composite, carbon fiber, fiberglass, etc.) straight tubes, tubular joints (including tubular "T" sections), and tubular elbows (or like components) which can be modularly arranged and re-arranged to form frames in various shapes and sizes as desired to fit and hold mini jig 100 cells and associated components in single-stage and multi-stage mini jig 100 arrangements. The mini jig 100 cells and components can be universal, to be used with each of the several mini jig 100 arrangements and configurations. The single motor included with a mini jig 100 kit can be used with single-stage and multi-stage mini jig 100 arrangements to drive one or more rocker arms, using included drive link components.

In another example, the frame of a mini jig 100 can be comprised of schedule 40 (or other dimension) PVC straight tubes, tubular joints (including tubular "T" sections), and tubular elbows (or like components) which can be modularly arranged and re-arranged to form frames in various shapes and sizes as desired to fit and hold mini jig cells and associated components in single-stage and multi-stage mini jig 100 arrangements. The mini jig cells and components can be universal, to be used with each of the several mini jig 100 arrangements and configurations.

When deployed, a mini jig 100 uses one approximately 750-1500 gallons per hour (gph) from a water source (e.g., pump) and one power source (12 volt battery, for example). In one example, a single lithium battery weighing approximately 5 lbs can power a mini jig 100 machine an entire day.

Example Embodiments of a Multi-Configuration Mini Jig

In various embodiments, a mini jig 100 can have one or more of the following characteristics:

1. A single mini jig 100 mining machine is capable of single-stage or multi-stage mineral (e.g., gold) recovery configurations.
2. A mini jig 100 (or mini jig kit) can include a duplex drive system, which includes at least two jig cells (e.g., 5.5 inch each) operated by a single drive motor with opposing up/down action by means of linked rocker arms.
3. A mini jig 100 (or mini jig kit) is light weight (approximately 15-20 lbs.) for true portability. For instance, in some embodiments, the primary frame construction is aluminum tubing with aluminum (or other lightweight material) components. In other embodiments, the primary frame construction is schedule 40 polyvinyl chloride (PVC) tubing with aluminum (or other lightweight material) components. Other lightweight frame materials (e.g., carbon fiber, fiberglass, composite, etc.) are also contemplated.
4. A mini jig 100 is compact (some embodiments can have dimensions of approximately 32"×22"×9") and can be backpacked, hauled on an ATV, or transported via personal watercraft or aircraft.
5. A mini jig 100 (or mini jig kit) is modular, where the major components are exchangeable and can be used in multiple configurations.
6. A mini jig 100 concentrates gold bearing material more efficiently than a sluice box.
7. A mini jig 100 in a multi-stage configuration provides more efficient concentration than single stage mineral jig.

In various embodiments, a mini jig 100 can have one or more of the following construction characteristics and can be made of one or more of the following example materials (or similar other materials):

1. The jig hutch 106 can be constructed of thermoformed poly vinyl chloride (PVC).
2. The frame 101, rocker arms 118, and piping 116 can be constructed of aluminum, fiberglass, carbon fiber, poly vinyl chloride, and like lightweight materials.
3. The motor 102 mount, mounting plates, chutes 105, jig trays 104, and shrouds can be made of aluminum or other rigid lightweight materials.
4. The jig diaphragms 112 can be made from rubber or a material with like properties.
5. The drive cam can be made of mild steel or another durable material.
6. The drive links 120 and other metal components can be made of steel alloy or another durable material.

Example Single Stage Mini Jig

Referring to FIGS. 1-7B, a single stage mini jig 100 is shown, according to an embodiment. The single stage mini jig 100 is shown as a duplex jig, having two jig cells (jig cell 1 and jig cell 2) in a single stage. The jig cells are side-by-side and operate concurrently. For instance, both jig cells (jig cell 1 and jig cell 2) can be driven by a single motor 102. Other single stage mini jigs 100 may have a single jig cell or more than two jig cells in the single stage. Adding jig cells improves efficiency, including throughput.

A modular mini jig 100 cell can include the following components: A jig tray 104 with a discharge chute 105, a jig hutch 106, one or more jig screens 108, a quantity of jig bed media 110, a diaphragm 112, and an underflow or discharge tube 114. A jig cell may have additional components or equivalent components. Any quantity of jig cells can be used with a mini jig 100, and can be arranged in a side-by-side arrangement per stage (see FIG. 1, for example) and in multi-stage arrangements (see FIG. 16, for example) in a frame 101. Depending on the arrangement, during operation a manifold 116 continually feeds water into the hutch 106 and over the jig bed media 110. Typically a single rocker arm 118 per stage is coupled to the motor 102 via drive links 120 and moves the diaphragm 112 of each jig cell in an up and down motion. Multiple rocker arms 118 per stage are also possible, or other jigging mechanisms that move the diaphragm 112 of each jig cell in the up and down motion. These can be coupled to the motor 102 using drive links 120. Springs may also be used to assist the up and down motion of the diaphragms 112.

During operation, supply water fills each jig hutch 106 via a manifold 116 and overflows the jig tray 104, exiting the front of the jig tray 104 at the discharge chute 105. Waste (or tailings) that is less dense than the minerals of interest can exit the discharge chute 105 with the overflow of water. A portion of the water also exits at each underflow nipple 114 at a low portion of each diaphragm 112 directly below each hutch 106.

Each jig tray 104 contains a screen 108 of mesh (e.g., stainless steel or the like). For instance, the screen 108 can comprise a 30, 60, or 100 grid mesh, depending on the screen size desired. The size of the screen 108 determines the size of the particles (e.g., minerals) that will pass through it. On the screen 108 can be disposed 3 or 4 layers (for example) of jig media, such as steel balls (e.g., ¼ inch jig shot or the like) that acts as a bedding material 110. Feed material, or soil that contains the minerals, is placed on the bedding 110.

The rocker arm 118 is coupled at one end to the motor 102, via one or more drive links 120. Each end (one or both, depending on the number of jig cells) of the rocker arm 118 is connected to a jig diaphragm 112 and the rocker arm 118 is pivotally coupled to the frame 101. The ends of the rocker arm 118 are driven up and down as the rocker arm 118 moves in a pivoting action at approximately 300 strokes per minute (or other suitable rate) as driven by the motor 102. The throw of the rocker arm 118 ends can be about 1.5 inches, for example, "jigging" the lower portion of the diaphragms 112 by that distance, which pushes water up and into the jig cells and the jig tray 104, and thereby moves the hutch 106 water and bedding 110 up and down at the same frequency (e.g., about 300 strokes per minute).

The feed material (containing minerals mixed with waste) passes over the bedding 110, and the light particles are washed and bounced out the front chute 105 of the jig tray 104 with the overflow water. Heavy or dense particles (e.g., minerals) fall into the bedding 110, slipping between the jig shot with each up stroke of the rocker arm 118 as the bedding 110 lifts and separates, and are trapped as each down stroke sucks the bedding 110 back down and together. The heavy particles begin to slip through the screen 108 or enhance the effectiveness of the bedding 110 (if they stay trapped on the jig bed screens 108).

As more feed material is introduced to the jig tray 104, the densest and heaviest particles begin to displace those with less specific gravity, thus the reason for steel jig shot or like jig bedding media 110. The heavy particles that pass through the screen 108 (i.e., concentrates) are discharged from the hutch 106 via the under flow nipple 114. These heavy particles can be collected in a concentrates container.

Flowchart Showing an Example of Operation

Figure 8:
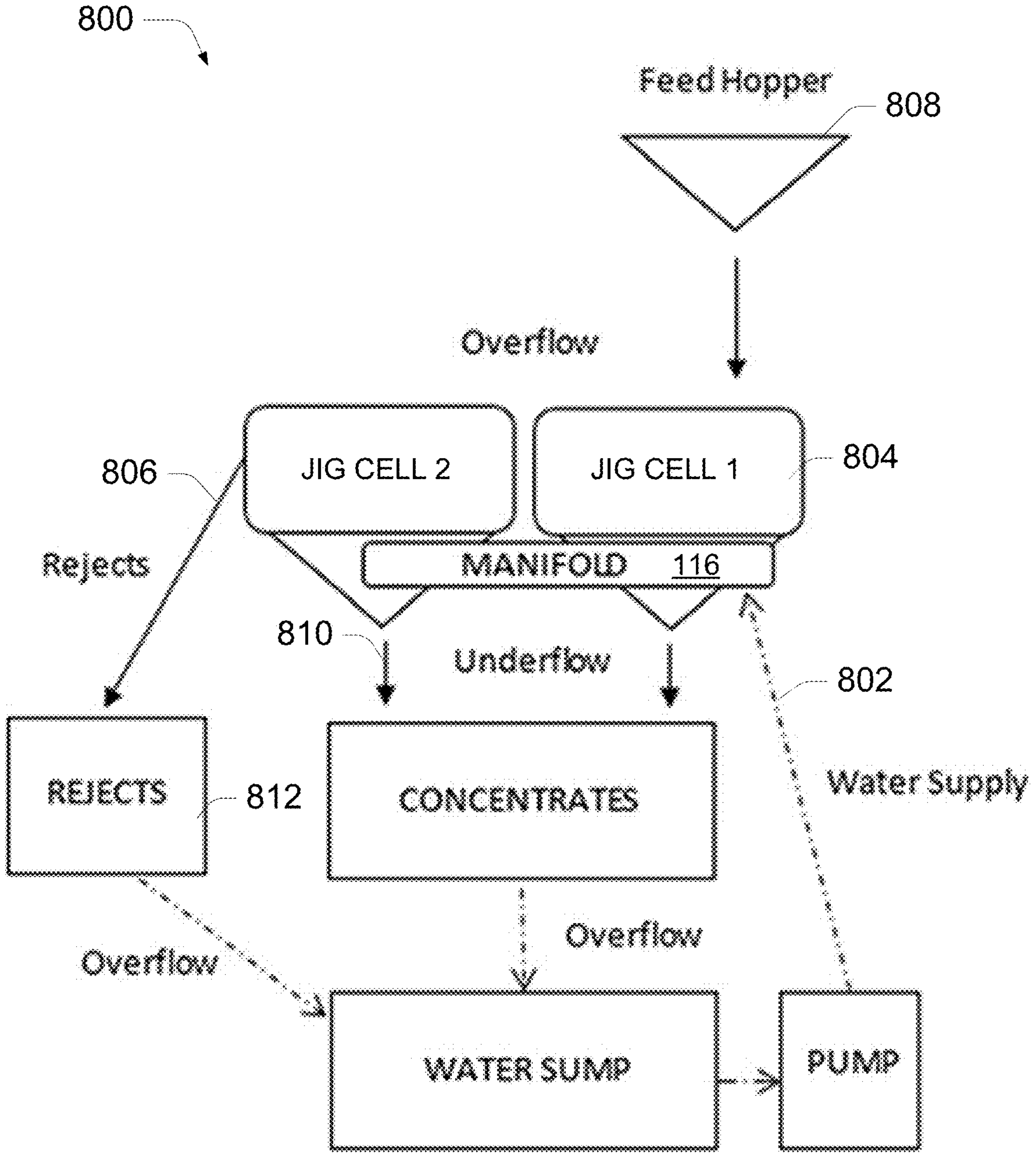
FIG. 8 shows a flow diagram of an example operation of a single stage mini jig, according to an embodiment.

The operation of an example single stage mini jig 100 as shown in the embodiments of FIGS. 1-7B and 17 can be described with the flow chart illustrated at FIG. 8. Note that the example single stage mini jig 100 shown in the embodiments of FIGS. 1-7B is a duplex jig, meaning that there are two side-by-side jig cells (jig cell 1 and jig cell 2) at a single stage. A single stage mini jig 100 with one jig cell or more than two jig cells operates in a similar manner, as described herein.

At block 802, water is pumped into the intake manifold 116, which is coupled to each jig cell at the respective hutch 106. At block 804, the water fills and overflows each jig cell at each hutch 106, flowing across the top of the jig tray 104, from the first jig cell (jig cell 1, at the rear) to the second jig cell (jig cell 2, at the front). At block 806 the overflowing water flows off the discharge chute 105 (see FIG. 5, for example). Water also discharges from the bottom of each jig cell through a flow-limited discharge tube 114 (underflow).

Figure 3:
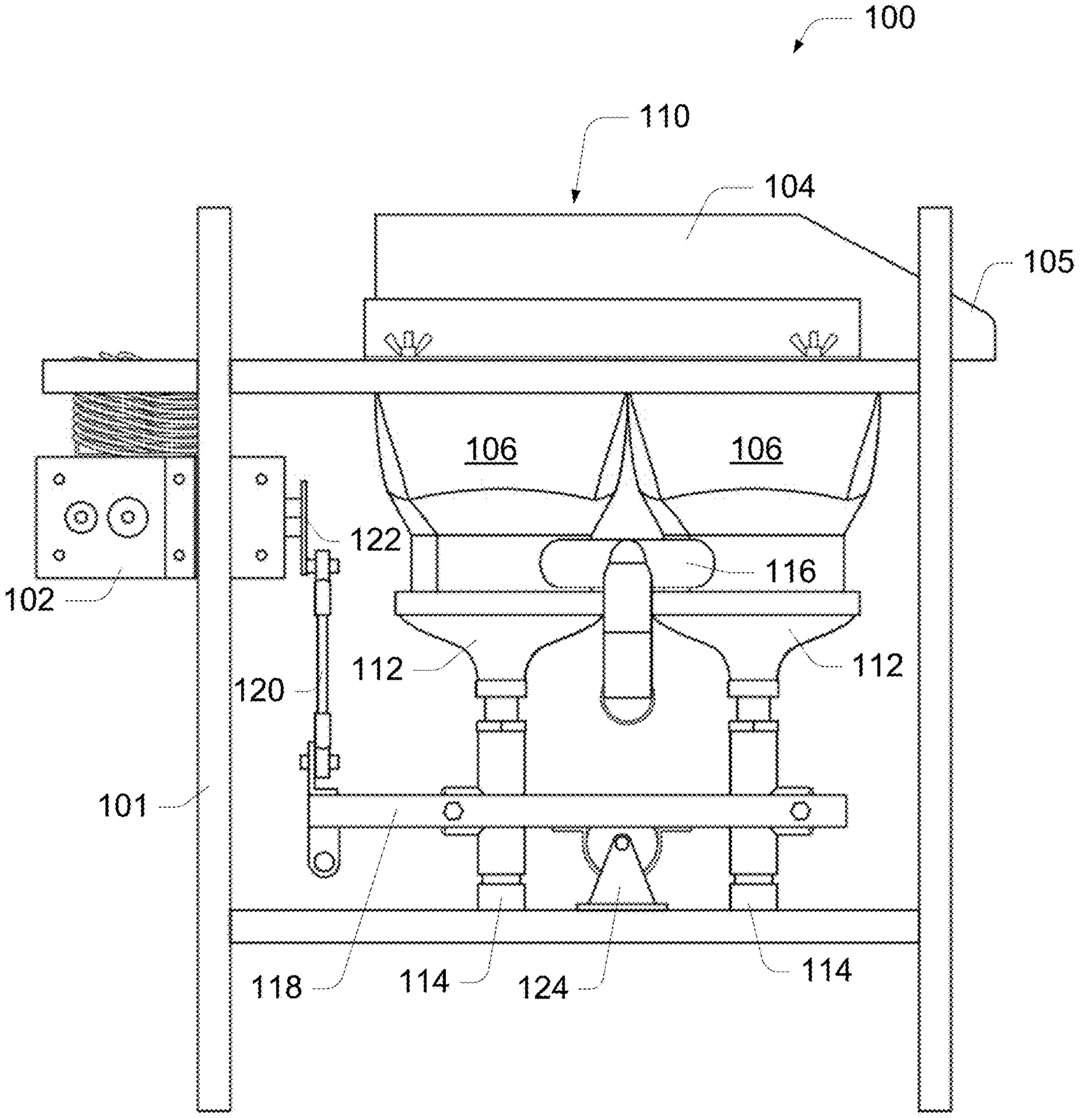
FIG. 3 is a left side view of an example single-stage duplex mini jig, according to an embodiment.
Figure 4:
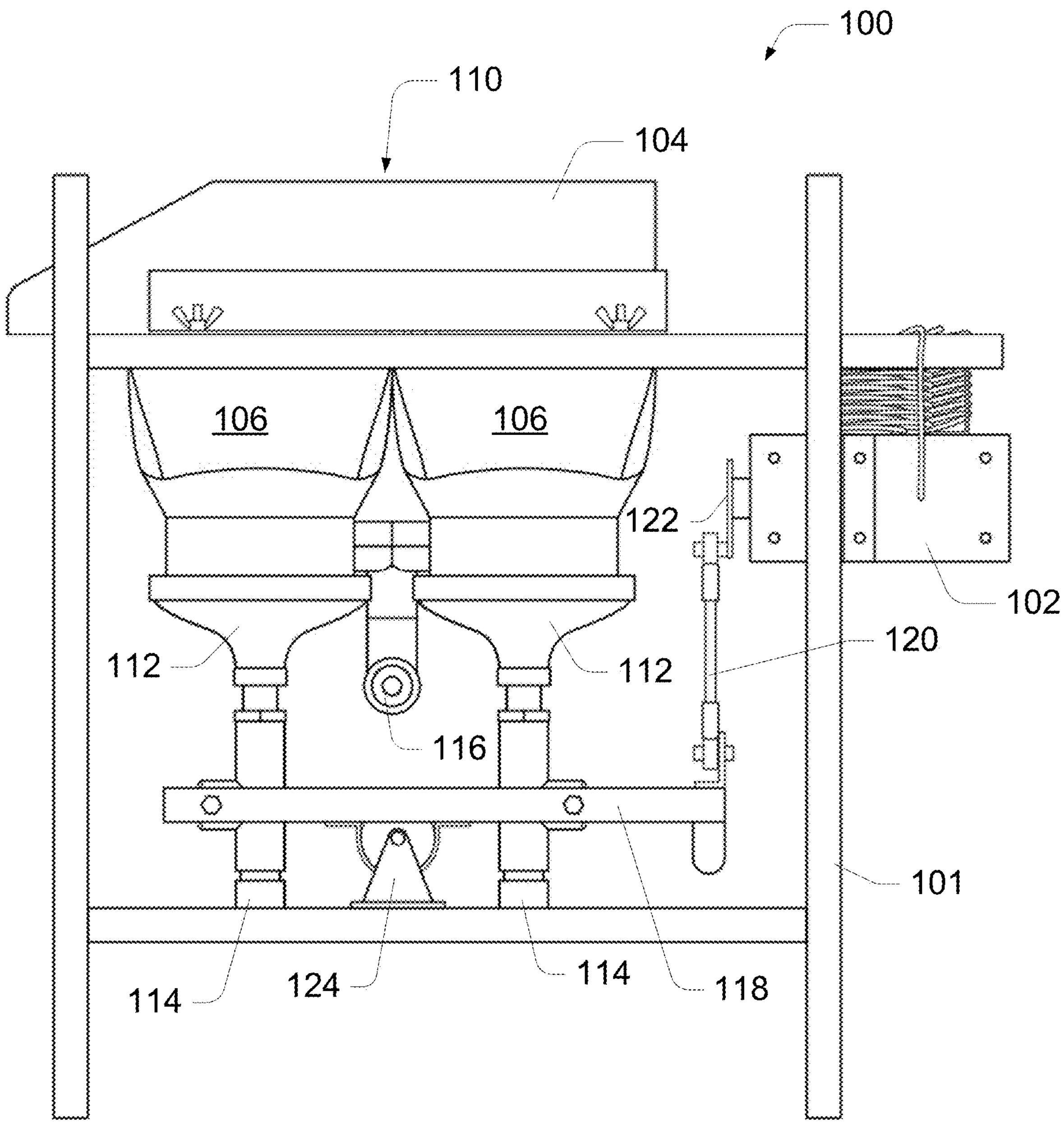
FIG. 4 is a right side view of an example single-stage duplex mini jig, according to an embodiment.
Figure 5:
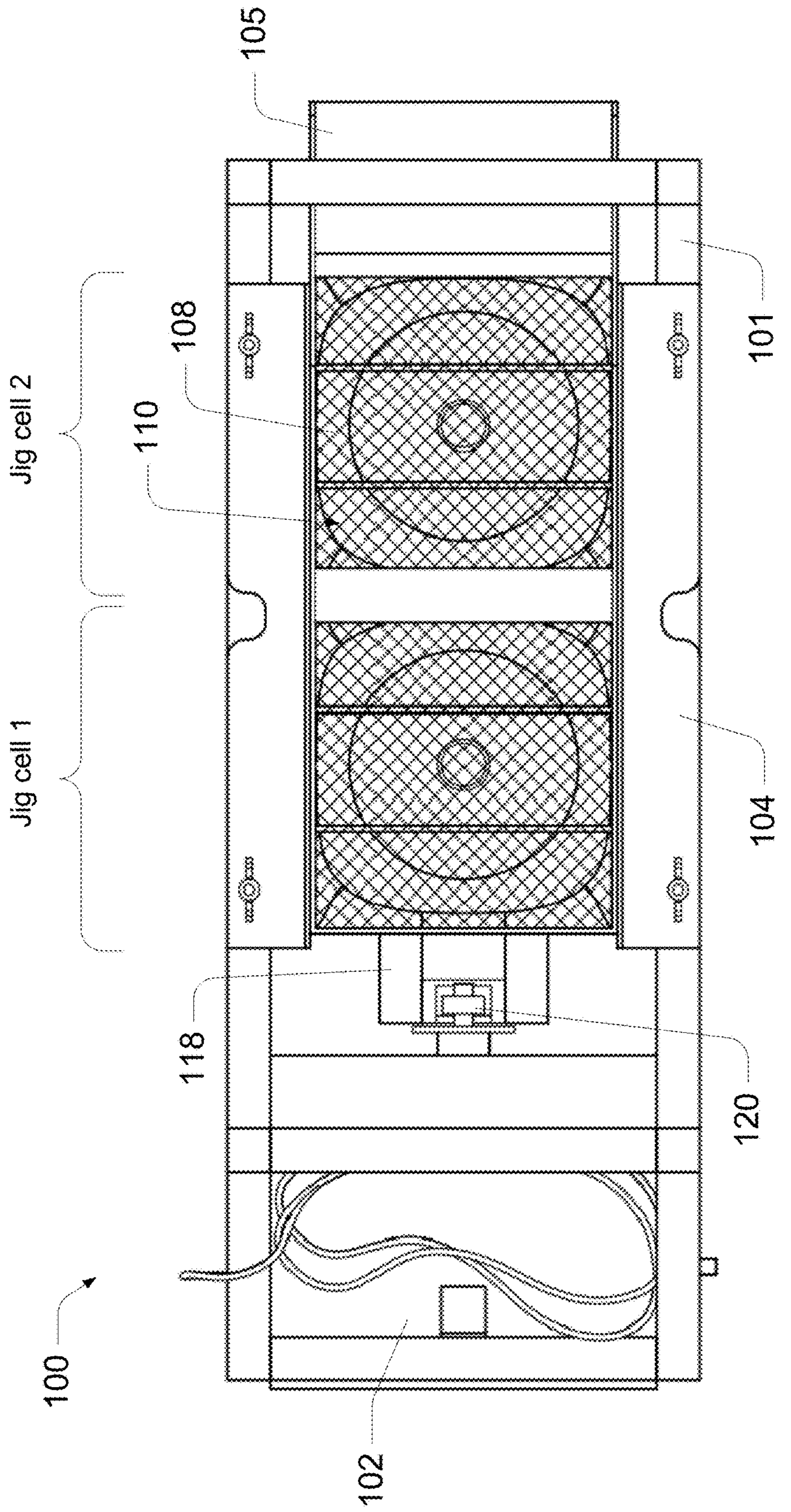
FIG. 5 is a top view of an example single-stage duplex mini jig, according to an embodiment.
Figure 6:
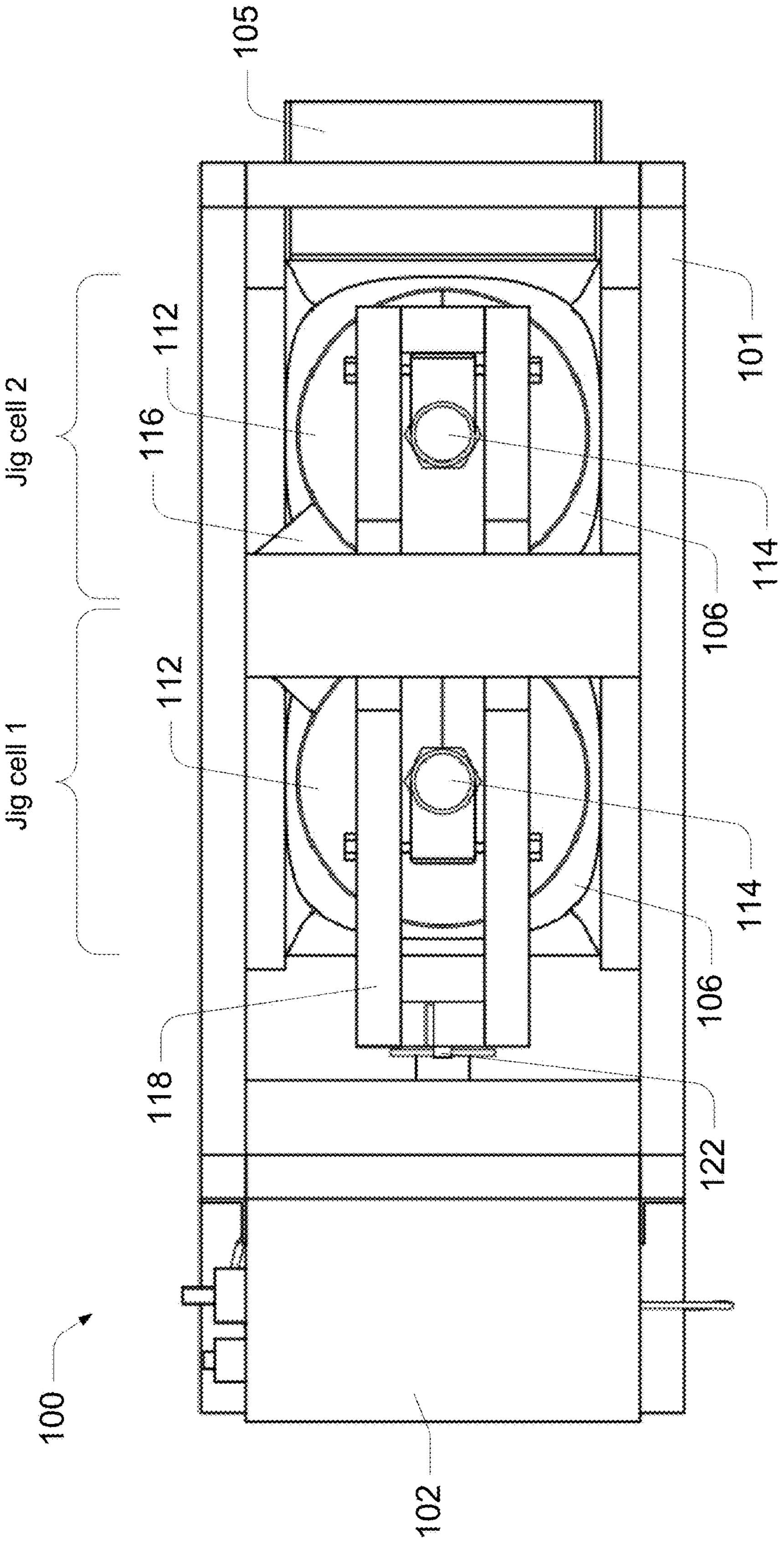
FIG. 6 is a bottom view of an example single-stage duplex mini jig, according to an embodiment.
Figure 7A:
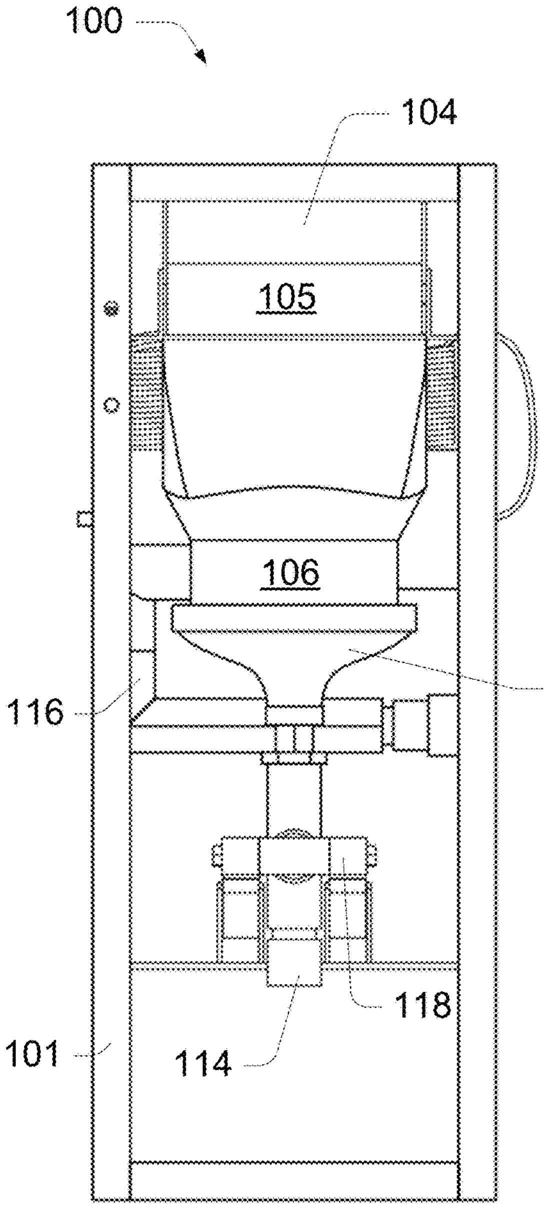
FIG. 7A shows a front view of an example single-stage duplex mini jig, according to an embodiment.
Figure 7B:
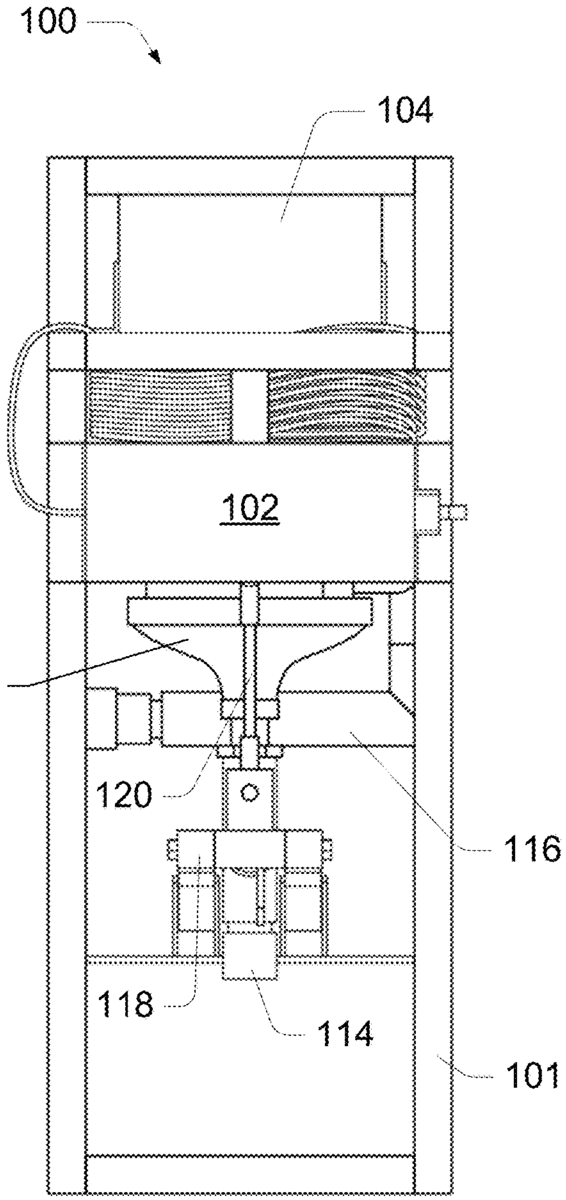
FIG. 7B shows a back view of an example single-stage duplex mini jig, according to an embodiment.

As shown at FIGS. 3 and 4, the rocker arm 118 is coupled to the motor 102 via a mechanical cam 122, which causes the rocker arm 118 to pivot at pivot point 124 as the motor 102 turns. As each end of the rocker arm 118 rises and falls with the pivot of the rocker arm 118, the diaphragm 112 coupled to the rocker arm 112 end(s) moves in a jigging action. The up and down jigging action of the diaphragm 112 under each jig cell causes the jig bed media 110 (a bed of jig media, such as steel balls, etc. resting on the classifying screen 108 in each jig cell) in each tray 104 to rise and fall. Each up stroke increases the upward flow of water in the respective hutch 106, lifting and separating the jig bed media 110. Each down stroke of the diaphragm 112 pulls the jig bed media 110 down and together.

At block 808, feed material (e.g., soil, etc.) bearing gold or any mineral of interest is fed into the jig tray 104 over jig cell #1. The flow of water across the jig tray 104 separates lighter material in the feed material from heavier material. Lighter material floats across the jig tray 104 over to jig cell #2, while heavier material sinks into the jig bed media 110 of jig cell #1, creating a more efficient jig bed at jig cell #1. Within jig cell #2, the lightest material flows out of the discharge chute 105 with the overflow, while heavier material sinks into the jig bed media 110 of jig cell #2, creating a more efficient jig bed at jig cell #2. Note that any number of jig cells can share a single jig tray 104, or have individual and connected jig trays 104.

At block 810, heavy material at each jig cell that is smaller than the classifying screen 108 of the jig cell passes through the screen 108 and continues downward through the discharge tube 114 (underflow) of the respective jig cell. In some cases, the classifying screens 108 of the jig cells can be sized differently to screen different sizes of material. The heavy material, which contains a higher percentage of the mineral of interest is known as concentrates. The concentrates can be collected in a containment. Heavy material that is too big to pass through the screens 108 are trapped in the respective jig beds 110. As more feed material is introduced, the jig trays 104 will continue to fill, trapping the heaviest material in the jig bed media 110 and rejecting the rest of the material out the discharge chute 105 at the #2 jig cell (overflow).

At block 812, optionally, the overflow water and rejected light material can pass into a rejects containment, with the water continuing to an overflow water sump. The water in the sump can be recycled (along with fresh water if desired) by pumping it back up into the manifold 116 to be distributed to the jig cells. Water can also be allowed to drain out of the containment for the concentrates, and can be recycled as well.

The trays 104 can be cleaned out after each use to recover any oversized pieces of mined mineral (e.g., gold). Fine gold is collected and recovered in the concentrates containment.

Example Multi-Stage Mini Jig

Figure 9:
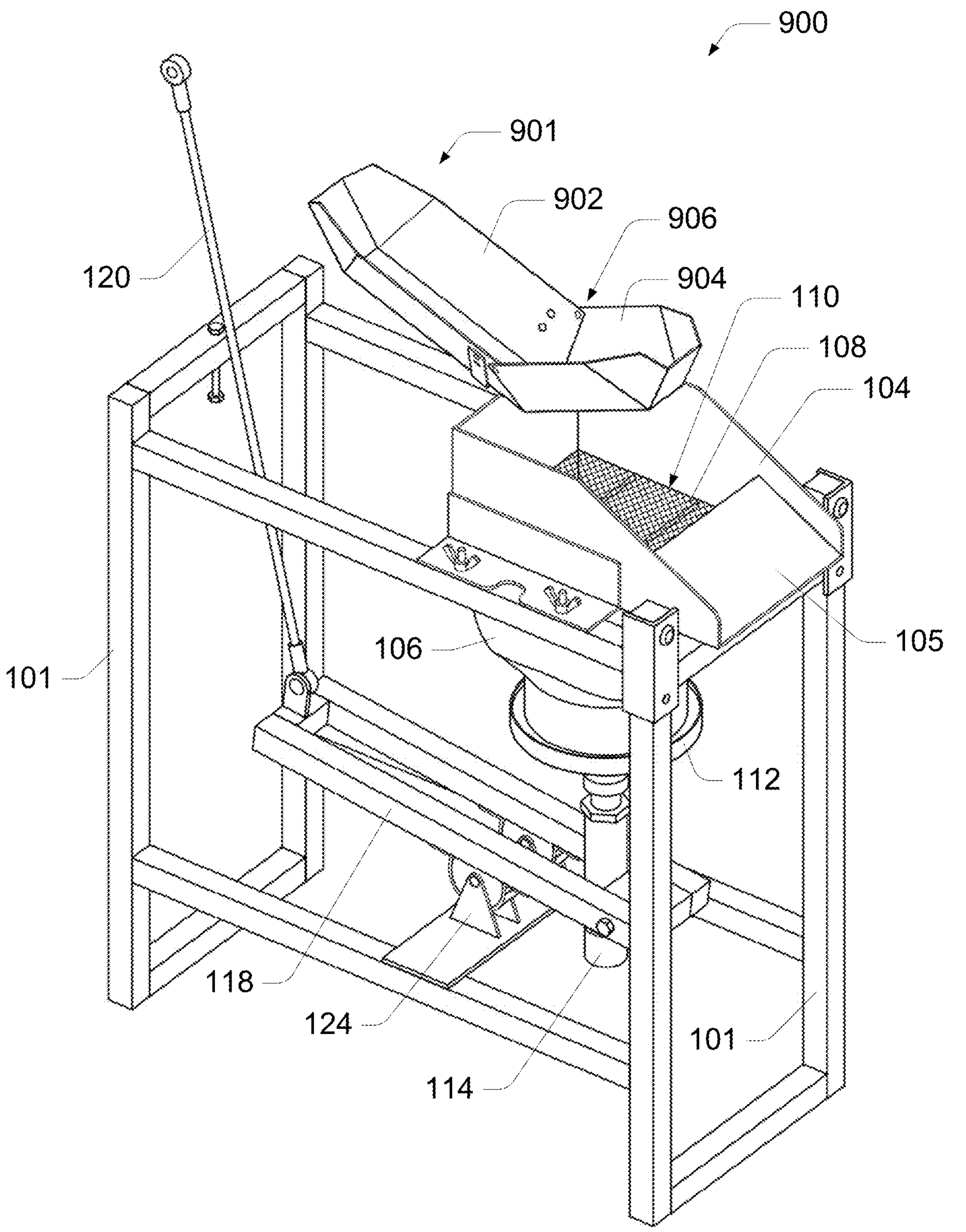
FIG. 9 is a perspective view of an example second-stage simplex mini jig, according to an embodiment.
Figure 10:
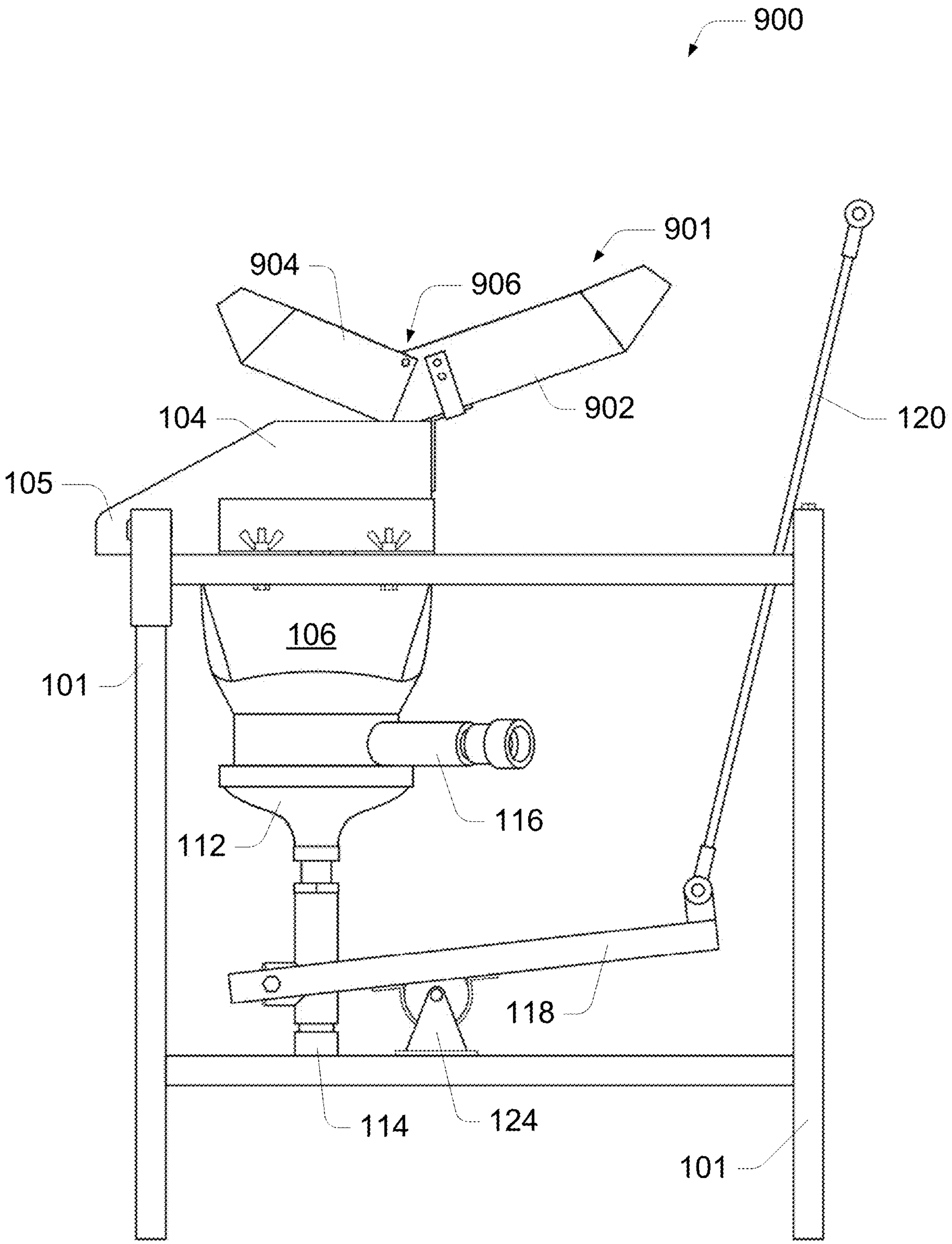
FIG. 10 is a side view of an example second-stage simplex mini jig, according to an embodiment.
Figure 11:
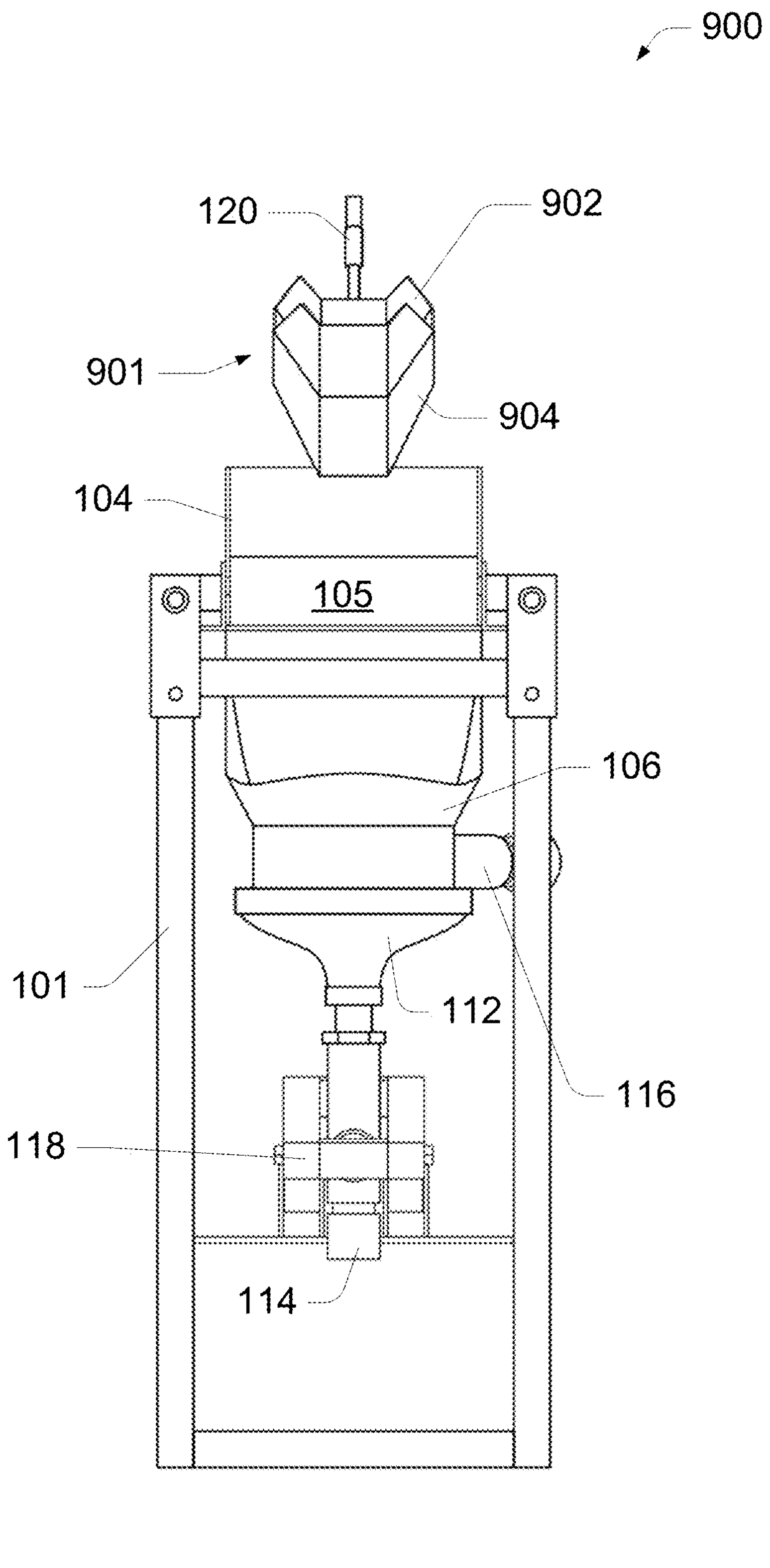
FIG. 11 is a front view of an example second-stage simplex mini jig, according to an embodiment.
Figure 12:
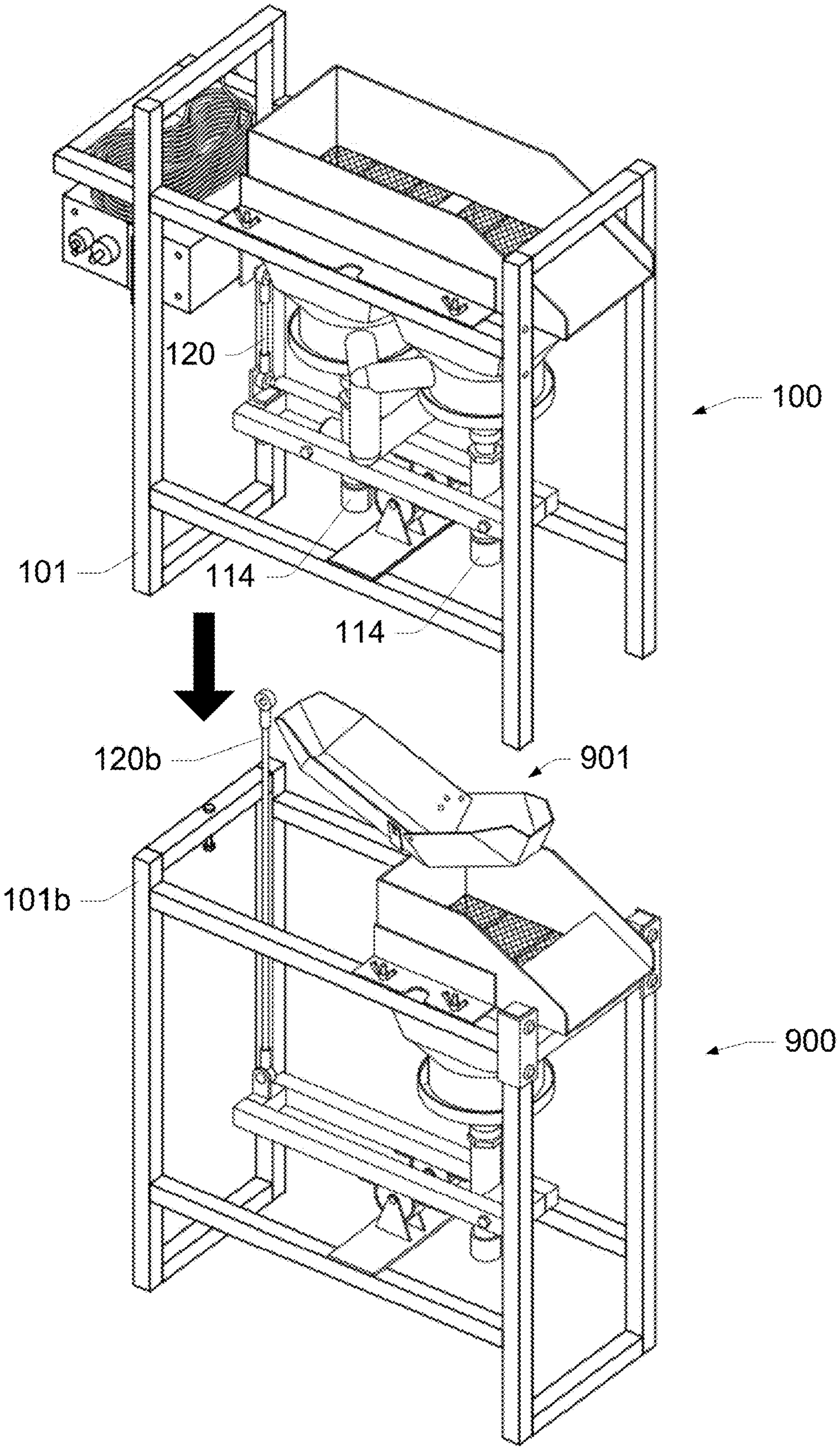
FIG. 12 is a perspective view of an example single-stage duplex mini jig being mated to a second-stage simplex mini jig, according to an embodiment.
Figure 13:
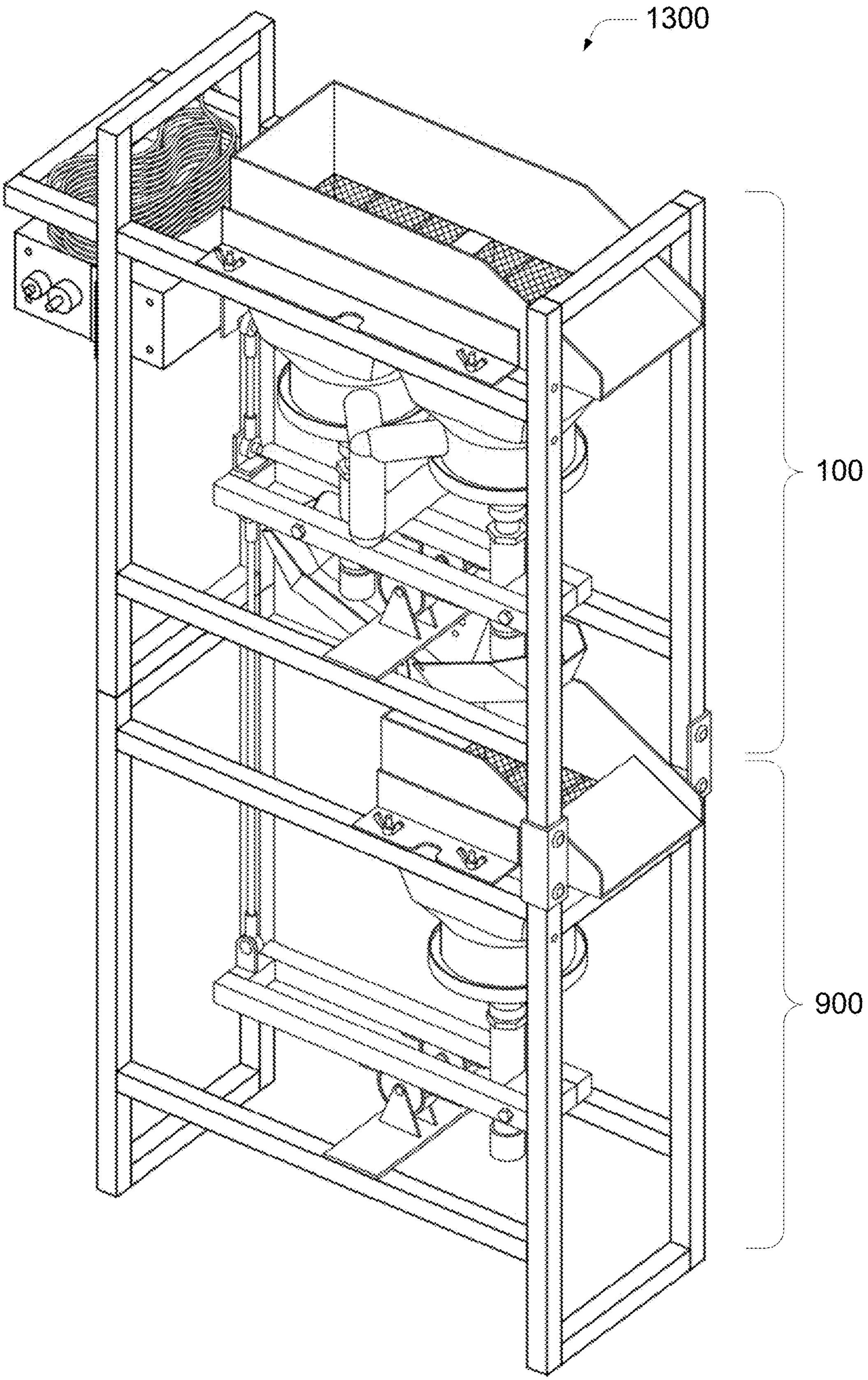
FIG. 13 is a perspective view of an example two-stage mini jig, according to an embodiment.

Referring to FIGS. 9-11, a multi-stage mini jig can be formed by the addition of a second stage mini jig 900 to the single stage mini jig 100. An example of joining a second stage mini jig 900 to a single stage mini jig 100 is shown at FIG. 12, and an example multi-stage mini jig 1300 is shown at FIG. 13. Many details in FIGS. 12 and 13 are omitted for clarity. Subsequent or additional jig stages (simplex, duplex, or multiplex), such as the second stage mini jig 900 or the like, can be added to the single stage mini jig 100 or the multi-stage mini jig 1300 to form a mini jig with as many stages as desired. In some embodiments, a mini jig kit can include the components to assemble various multi-stage mini jigs in various configurations.

Referring to FIGS. 9-11, an example second stage (i.e., subsequent stage) mini-jig 900 is illustrated. While a single jig cell configuration is illustrated, the second stage mini jig 900 can include two or more jig cells.

The operation of the second stage mini jig 900 is basically the same as the operation of the single stage mini jig 100 described above. For example, the second stage mini jig 900 includes a manifold **116*b* where water is pumped into the one or more hutches 106*b* and fills the hutch(es) 106*b*. Water overflowing the hutch(es) 106*b* fills the jig tray 104*b* and overflows out of the chute 105*b*. Feeder material for the second stage mini jig 900 comes from the discharge tube 114 (underflow) of the one or more jig cells of the stage above and is deposited in the jig tray 104*b* of the second stage mini jig 900**.

Figure 17:
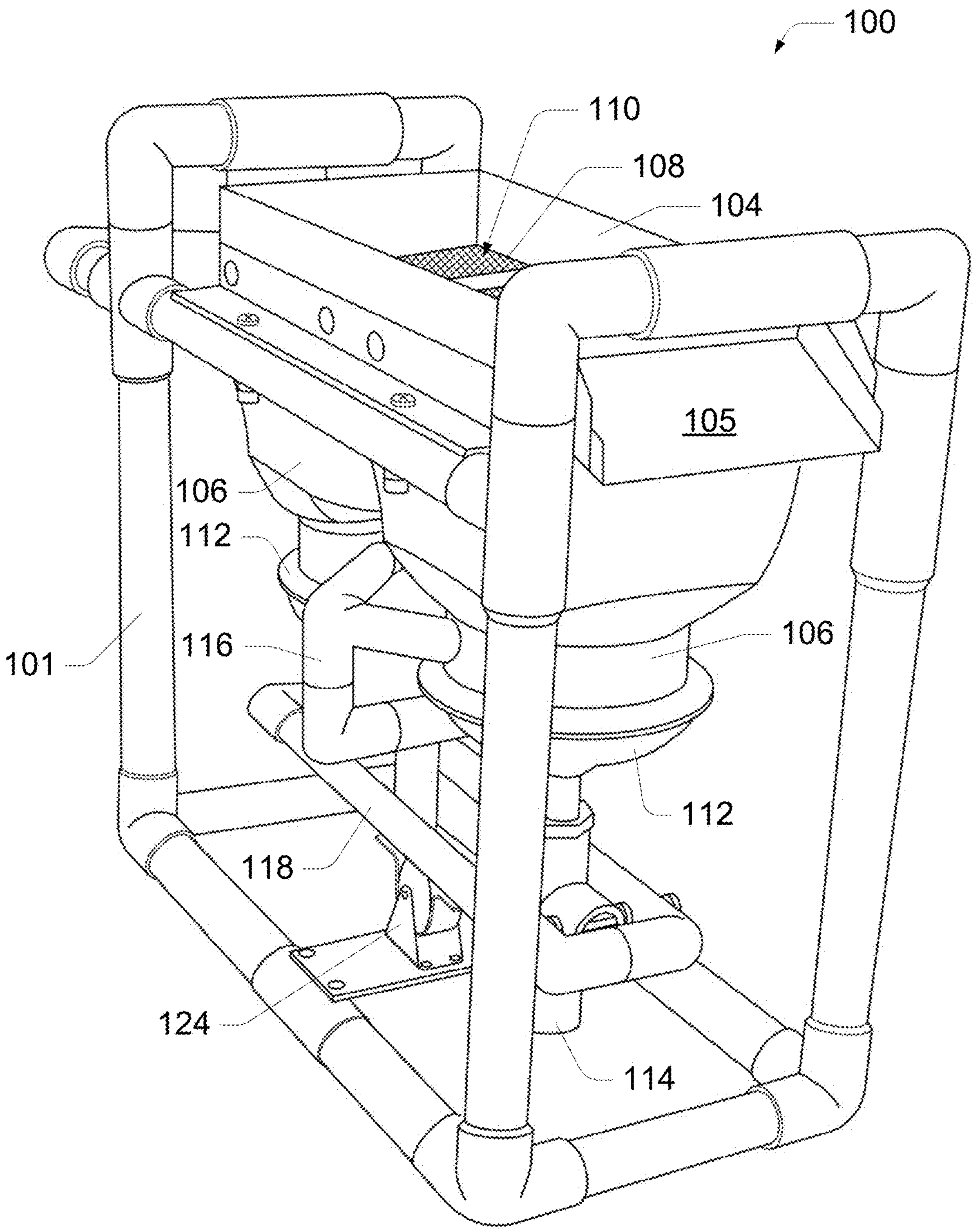
FIG. 17 is a perspective view of an example single-stage mini jig, according to another embodiment.

In some embodiments, as shown at FIGS. 9-11, the second stage mini jig 900 can include an adjustable receiver 901 that receives the underflow from the one or more jig cells of the previous (above) stage. For instance, the receiver 901 can include at least two chute-shaped receiver portions: a rear receiver portion 902 and a front receiver portion 904, which can be pivotally coupled at a hinge connector 906. The hinge connector 906 allows the at least two receiver portions (902 and 904) to be adjusted (e.g., pivoted) to receive underflow from one or more underflow tubes 114 of the stage above. The at least two receiver portions (902 and 904) meet with an opening between them, that allows the underflow to flow out of the receiver 901 and into the jig tray **104*b* of the second stage mini jig 900. Note that if the receiver is not present (for instance as shown at FIG. 17), the underflow simply flows from the nipple 114 of the previous stage and onto the jig tray 104*b* of the second stage mini jig 900**.

The second stage mini jig 900 is positioned below and attached to the lower portion of the single stage mini jig 100 as shown at FIG. 12 to form a multistage mini jig 1300 (shown at FIGS. 13-15). The respective frames **101*b* and 101 of the second stage mini jig 900 and the single stage mini jig 100, respectively, are coupled together using removable fasteners, if desired. The receiver 901 is positioned below the one or more underflow nipples 114 of the single stage mini jig 100 to catch the underflow from the single stage mini jig 100 and distribute the underflow to the tray 104*b* of the second stage mini jig 900. Finally, the drive link 120*b* of the second stage mini jig 900 is coupled to the drive link 120 of the single stage mini jig 100 to drive the rocker arm 118*b* of the second stage mini jig 900**.

Figure 14:
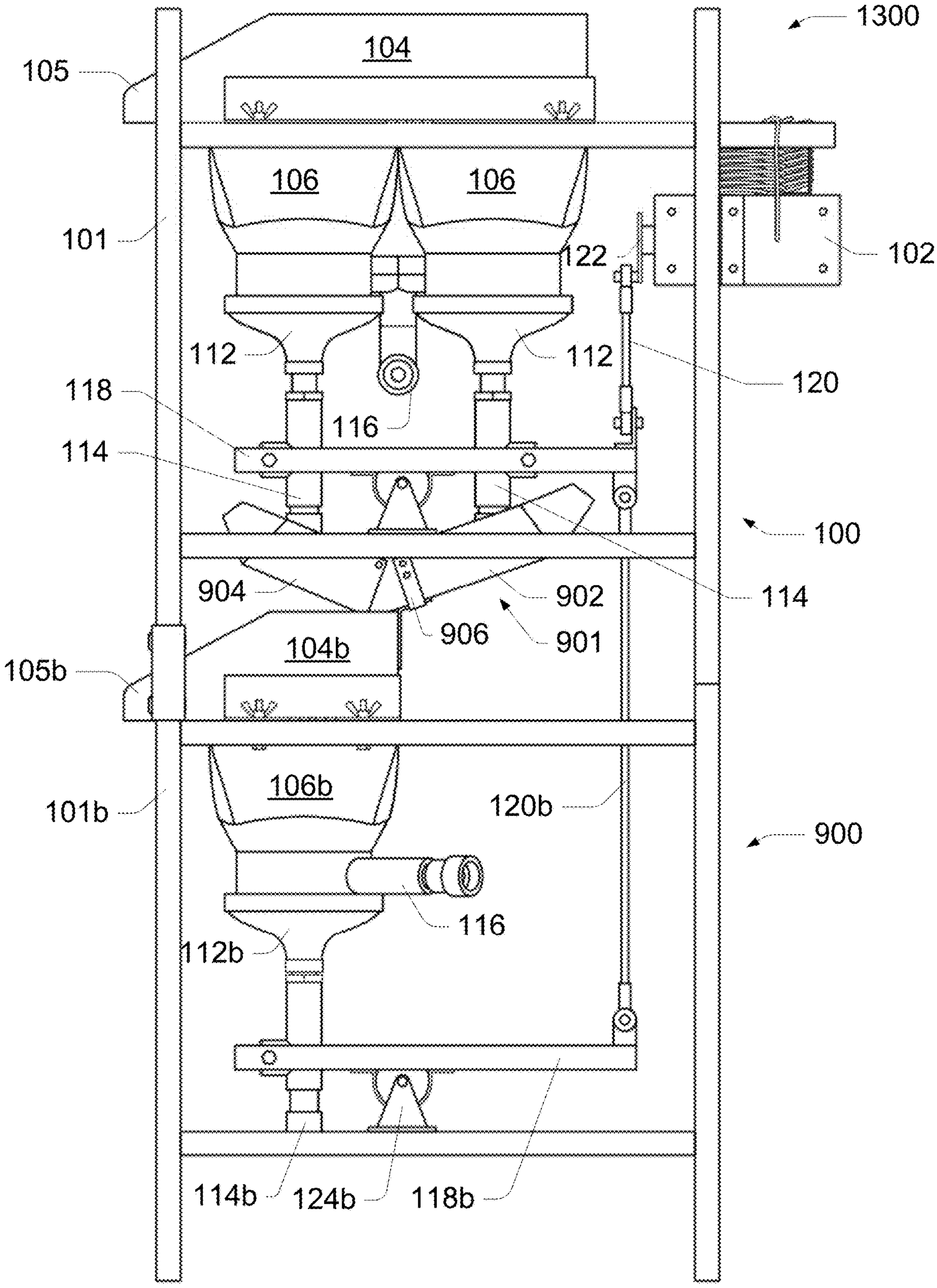
FIG. 14 is a side view of an example two-stage mini jig, according to an embodiment.
Figure 15:
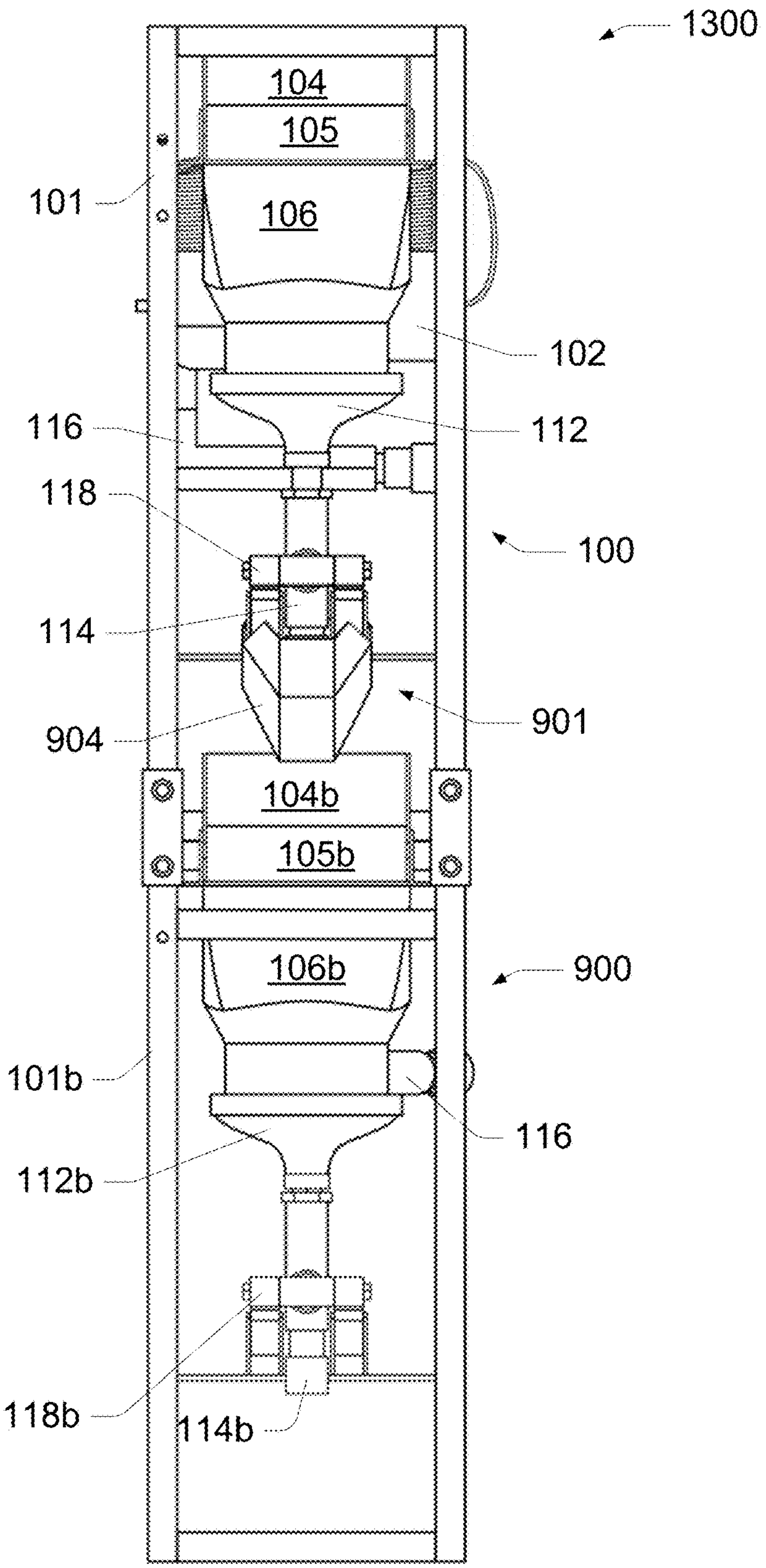
FIG. 15 is a front view of an example two-stage mini jig, according to another embodiment.

An example completed multistage mini jig 1300 is shown at FIGS. 13-15. The jig cells are arranged in a cascading configuration and can operate concurrently. For instance, all jig cells can be driven by a single motor. Adding jig cells and stages improves efficiency, including throughput.

During operation, supply water fills the jig hutch(es) 106 of the first stage jig cells via a manifold 116 and overflows, exiting the front of the jig tray 104 at the jig chute 105 of the first stage 100. Waste (or tailings) that is less dense than the minerals of interest can exit the first stage chute 105 with the overflow of water. A portion of the water also exits at one or more under flow openings 114 at a low portion of the diaphragm 112 directly below the hutch 106 of the first stage 100.

Each jig tray 104 contains a screen 108 of mesh (e.g., stainless steel or the like). For instance, the screen 108 can comprise a 30, 60, or 100 grid mesh, depending on the screen size desired. The size of the screen 108 determines the size of the particles (e.g., minerals) that will pass through it. On the screen 108 can be disposed 3 or 4 layers (for example) of jig media, such as steel balls (e.g., ¼ inch jig shot or the like) that acts as a bedding material 110. Feed material, or soil that contains the minerals, is placed on the bedding 110.

The rocker arm 118 is coupled at one end to the motor 102, via one or more drive links 120. Each end (one or both, depending on the number of jig cells) of the rocker arm 118 is connected to a jig diaphragm 112 and the rocker arm 118 is pivotally coupled to the frame 101. The ends of the rocker arm 118 are driven up and down as the rocker arm 118 moves in a pivoting action at approximately 300 strokes per minute (or other suitable rate) as driven by the motor 102. The throw of the rocker arm 118 ends can be about 1.5 inches, for example, "jigging" the lower portion of the diaphragms 112 by that distance, which pushes water up and into the jig cells and the jig tray 104, and thereby moves the hutch 106 water and bedding 110 up and down at the same frequency (e.g., about 300 strokes per minute).

The feed material (containing minerals mixed with waste) passes over the bedding 110, and the light particles are washed and bounced out the front chute 105 of the jig tray 104 with the overflow water. Heavy or dense particles (e.g., minerals) fall into the bedding 110, slipping between the jig shot with each up stroke of the rocker arm 118 as the bedding 110 lifts and separates, and are trapped as each down stroke sucks the bedding 110 back down and together. The heavy particles begin to slip through the screen 108 or enhance the effectiveness of the bedding 110 (if they stay trapped on the jig bed screens 108).

As more feed material is introduced to the jig tray 104, the densest and heaviest particles begin to displace those with less specific gravity, thus the reason for steel jig shot or like jig bedding media 110. The heavy particles that pass through the screen 108 (i.e., concentrates) are discharged from the hutch 106 via the under flow nipple 114. These heavy particles flow with the underflow water into the jig tray **104*b* of the second stage, via the receiver 901** (if present).

The heavier particles that pass through the screen 108 of the first stage jig cell(s) are discharged from the hutch(es) 106 of first stage jig cells via the under flow nipples 114 and into the jig tray **104*b* of the second stage jig cell(s). Underflow from the first stage jig cell(s) passes over the bedding 110*b* in the tray 104*b* of the second stage jig cell(s), and all of the lighter particles are washed and bounced out the front chute 105*b* of the second stage jig tray 104*b*** with the overflow.

Heavy or dense particles fall into the bedding **110*b* of the second stage jig cell, slipping between the jig media 110*b* with each up stroke of the rocker arm 118*b* as the bedding 110*b* lifts and separates, and are trapped as each down stroke of the rocker arm 118***b* draws the bedding 110*b* back down and together. The heavy particles begin to slip through the screen 108*b* or enhance the effectiveness of the bedding 110*b* (if they stay trapped on the jig bed) of the second stage 900.

As more feed material is introduced into the tray 104*b* of the second stage, the densest and heaviest particles begin to displace those with less specific gravity, thus the reason for steel jig shot or like jig bedding media 110*b*. The heavies that pass through the screen 108*b* of the second stage jig cell (i.e., concentrates) are discharged from the hutch 106*b* via the under flow nipple 114*b* of the second stage jig cell. They can be collected in a concentrates container, or can be passed to a subsequent jig stage. Each subsequent jig stage includes at least one jig cell, which operates as described relative to the second stage jig cell.

Flowchart Showing Example of Operation

Figure 16:
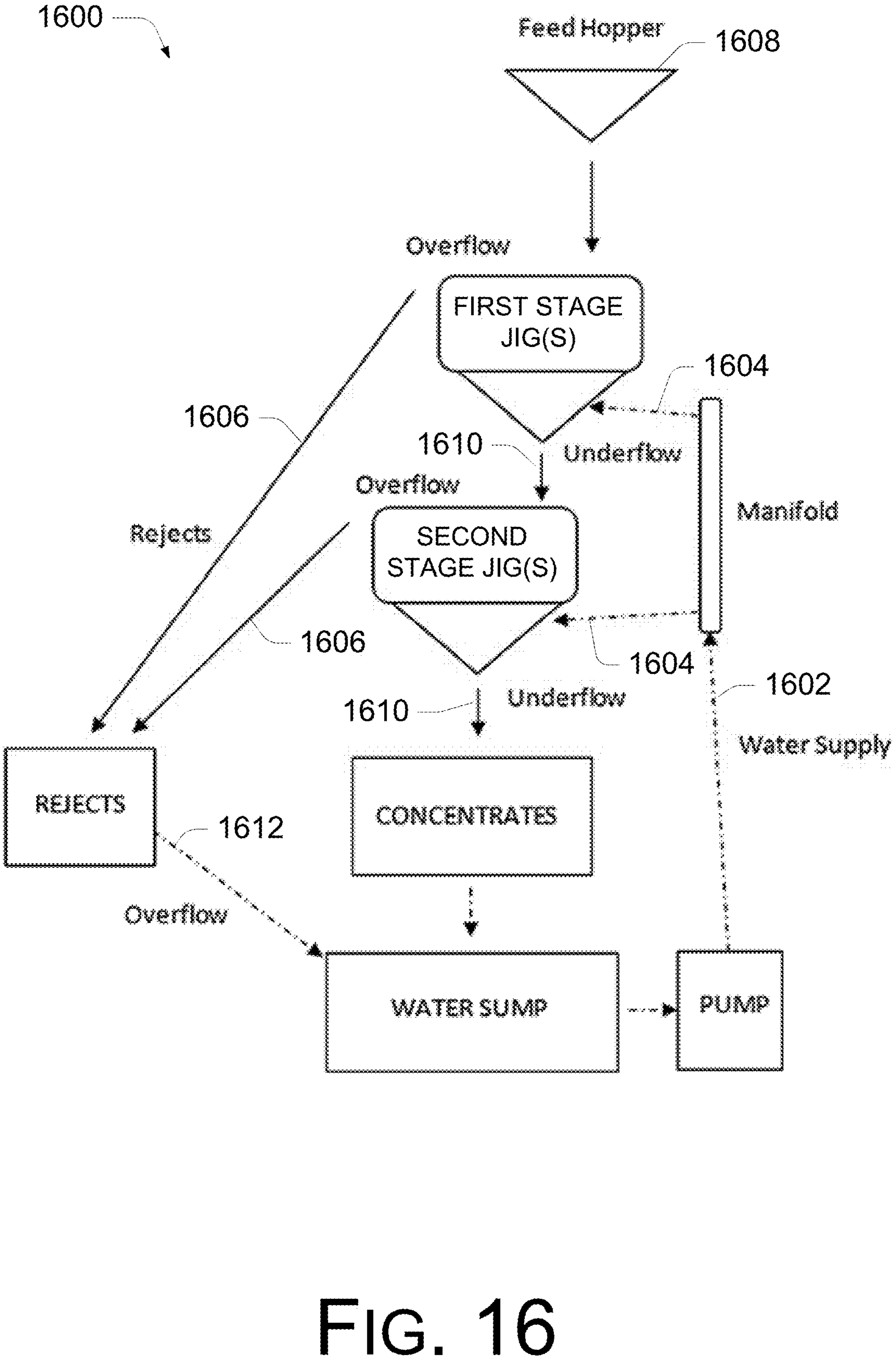
FIG. 16 shows a flow diagram of an example operation of a multistage mini jig, according to an embodiment.

Example operation of the example multi-stage mini jig 1300 shown in the embodiments of FIGS. 13-15 and 18 can be described can be described with the flow chart illustrated at FIG. 16. Note that the example multistage mini jig 1300 shown in the embodiments of FIGS. 13-15 includes a duplex first jig stage and a single jig second stage, meaning that there are two side-by-side jig cells (jig cell 1 and jig cell 2) at the first stage and a single jig cell at the second stage. A multistage mini jig 1300 with one jig cell or more than two jig cells in the first stage and one or more jig cells in the second stage operates in a similar manner, as described herein. Note that the example multi-stage mini jig 1300 shown in the embodiments of FIG. 18 includes a single jig cell at each of the first and second stages. A multi-stage jig with multiple jig cells in any of the stages or that has more than two stages operates in a similar manner, as described herein.

At block 1602, water is pumped into the intake manifold 116, which is coupled to each jig cell at the respective hutch(es) 106 and 106*b*. At block 1604, the water fills and overflows each jig cell at each hutch 106 and 106*b*, flowing across the top of the jig trays 104 and 104*b*. At block 1606 the overflowing water flows off the discharge chutes 105 and 105*b* (see FIG. 14, for example). Water also discharges from the bottom of each jig cell through a flow-limited discharge tube 114 and 114*b* (underflow). The underflow from the jig(s) of the first stage 100 flows into the jig tray 104*b* of the jig(s) of the second stage 900.

As shown at FIGS. 13 and 14, the rocker arms 118 and 118*b* are coupled to the motor 102 via a mechanical cam 122 and the drive links 120 and 120*b* that are coupled together. This causes the rocker arms 118 and 118*b* to pivot at pivot points 124 and 124*b* as the motor 102 turns. As each end of each rocker arm 118 and 118*b* rises and falls with the pivot of the rocker arms 118 and 118*b*, the diaphragms 112 and 112*b* coupled to the end(s) of the rocker arms 112 and 112*b* moves in a jigging action. The up and down jigging action of the diaphragms 112 and 112*b* under each jig cell causes the jig bed media 110 and 110*b* in each tray 104 and 104*b* to rise and fall. Each up stroke increases the upward flow of water in the respective hutch 106 and 106*b*, lifting and separating the jig bed media 110 and 110*b*. Each down stroke of the diaphragms 112 and 112*b* pulls the jig bed media 110 and 110*b* down and together.

At block 1608, feed material (e.g., soil, etc.) bearing gold or any mineral of interest is fed into the jig tray 104 over the first stage jig cell(s). Light material floats out the discharge chute 105 with the overflow, while heavy material sinks into the jig bed 110, creating a more efficient jig bed 110 at the first stage jig cell. At the second stage jig cell, light material flows out of the discharge chute 105*b* with the overflow, while heavy material sinks into the jig bed 110*b*, creating a more efficient jig bed 110*b* at the second stage jig cell.

At block 1610, heavy material at each jig cell stage (known as concentrates) that is smaller than the classifying screens 108 and 108*b* passes through the screens 108 and 108*b* and continues downward through the discharge tube 114 and 114*b* (underflow) of the respective jig cell stage. The concentrates from the first stage jig cell(s) (e.g., primary) feed the second stage jig cell(s) (e.g., secondary). In some cases, the classifying screens 108 and 108*b* of the jig cell stages are sized differently. For instance, the classifying screen 108*b* in the secondary jig tray(s) 104*b* can be finer than the classifying screen 108 in the primary jig tray 104, resulting in superfine concentrates exiting from the second stage jig cell(s).

Heavy material that is too big to pass through the screens 108 and 108*b* is trapped in the respective jig beds 110 and 110*b*. As more feed material is introduced, the jig trays 104 and 104*b* will continue to fill, trapping the heaviest material in the jig bed media 110 and 110*b* and rejecting the rest of the material out the respective discharge chutes 105 and 105*b* (overflow).

At block 1612, optionally, the overflow water and rejected light material can pass into a rejects containment, with the water continuing to an overflow water sump. The water in the sump can be recycled (along with fresh water if desired) by pumping it back up into the manifold 116 to be distributed to the jig cells. Water can also be allowed to drain out of the containment for the concentrates, and can be recycled as well.

The trays 104 and 104*b* can be cleaned out after each use to recover any oversized pieces of mined mineral (e.g., gold). Fine gold is collected and recovered in the concentrates containment.

Interchangeability and Configurability

Figure 18:
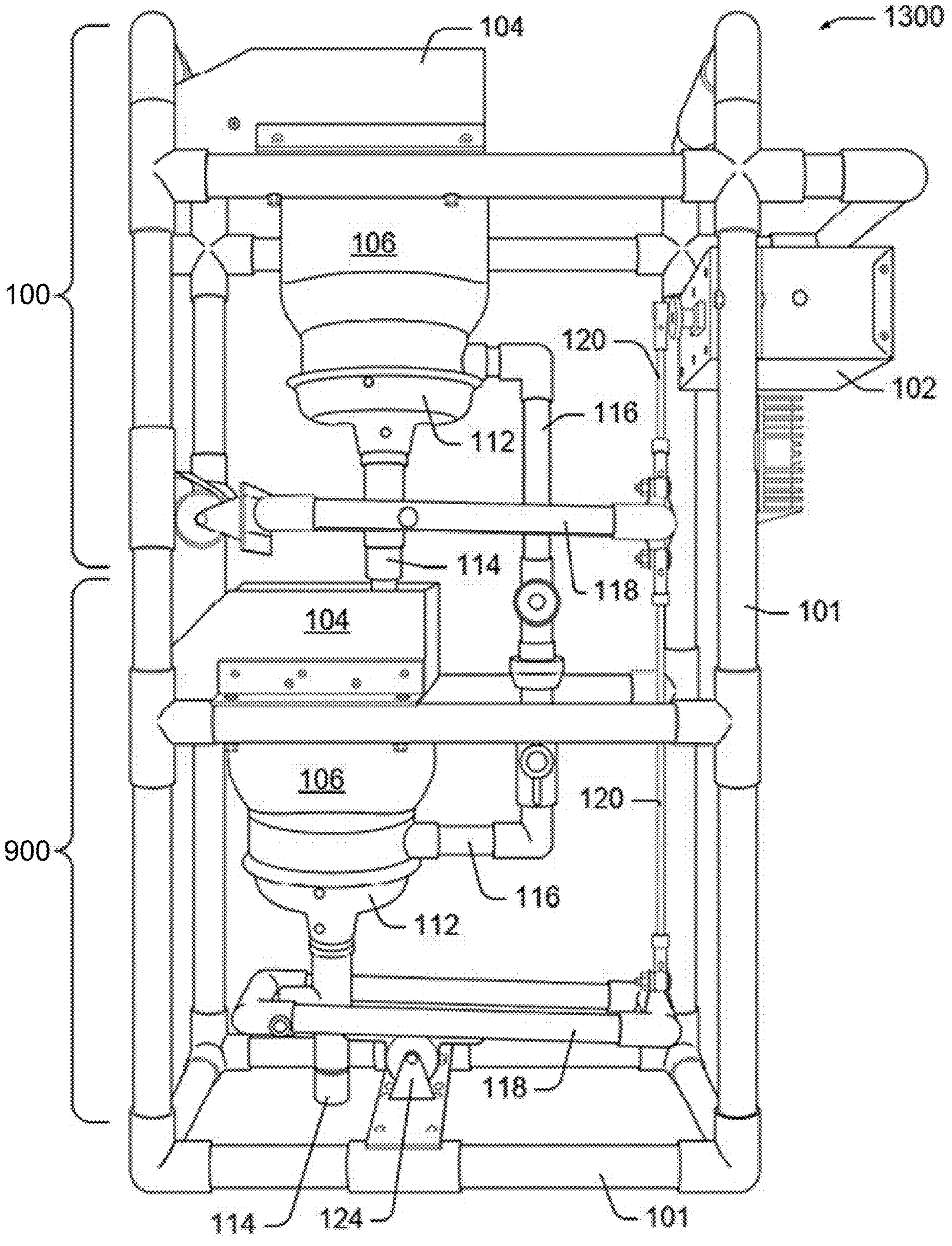
FIG. 18 is a side view of an example two-stage mini jig, according to another embodiment.

FIGS. 17 and 18 illustrate additional embodiments of mini jigs 100 and 1300, respectively. In various embodiments, a mini jig arranged as a single stage mini jig 100 can be reconfigured (in the field) as a multi-stage mini jig 1300, and vice versa. The jig cells of the respective mini jigs can be interchangeable within the respective mini jigs as well as within the various possible configurations. The support components, including the frame materials, rocker arms, fixtures, fasteners, motor, power supply, pump, and so forth can also be used in multiple configurations. Additional components, such as motor drive links, pivots, and so forth can be included in a mini jig kit for reconfigurations and additional arrangements as desired.

Figure 19:
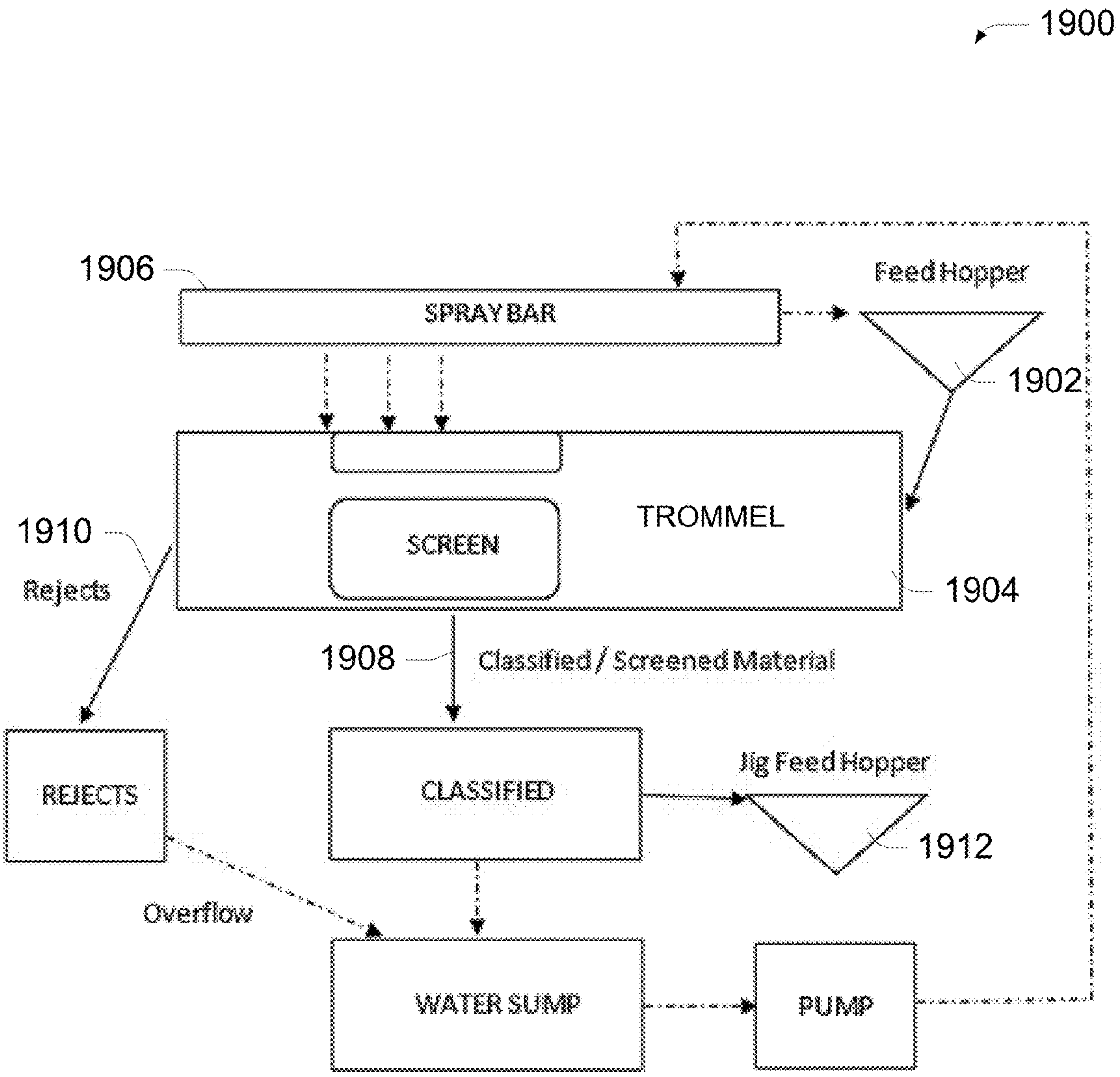
FIG. 19 shows a flow diagram of an example operation of a trommel, according to an embodiment.

In an example, an associated mini trommel (washer/classifier) can also be assembled from components included in a mini jig kit or supplied separately. An example operation 1900 of a mini trommel is disclosed relative to the flow chart at FIG. 19.

In an example, at block 1902 material is introduced to the trommel via a feed hopper located at the rear of the machine. At block 1904, the feed hopper remains stationary while the trommel barrel rotates slowly around a center axis. In some cases, the mini trommel can be more efficient when the rear of the machine is elevated a few degrees (e.g., about 2 degrees or so). A combination of the trommel's rotation, gravity, and a constant flow of water (at block 1906) from an internal spray bar and feed hopper spray nozzle keep the material moving slowly toward the discharge end (front) of the trommel barrel. At block 1908, as the material is washed, smaller material passes through classifying screen windows and larger material continues forward. The larger material is discharged while the smaller, classified material is discharged below the machine.

At 1910, most of the water is discharged through the classification screens, but some water is discharged with the rejected material out the discharge end (front) of the trommel barrel. At 1912, the classified output of the trommel can be input as feed material to any configuration of mini jig 100 or multistage mini jig 1300.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed or disclosed need be carried out in the specific order described.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing the claims.

What is claimed is:

1. An apparatus, comprising:

a multi-configuration portable mining machine, including:

a first jig cell having a first hutch with a discharge opening, a first classifying screen disposed within the first hutch, and a first diaphragm;

a second jig cell having a second hutch with a discharge opening, a second classifying screen disposed within the second hutch, and a second diaphragm;

a motor configured to push and pull on the first diaphragm and the second diaphragm via at least one rocker arm; and a support frame coupled to the first jig cell, the second jig cell, and the motor, the support frame being configurable to arrange the first jig cell and the second jig cell in a first side-by-side configuration and to arrange the first jig cell and the second jig cell in a second multi-stage cascade configuration.

2. The apparatus of claim 1, wherein the frame has a first length dimension, a first width dimension, and a first height dimension while in the first side-by-side configuration and has a second length dimension, a second width dimension, and a second height dimension while in the second multi-stage cascade configuration.

3. The apparatus of claim 2, wherein the first height dimension is different from the second height dimension.

4. The apparatus of claim 1, wherein the support frame is comprised of a plurality of tubes.

5. The apparatus of claim 4, wherein the plurality of tubes includes straight tube sections, tubular elbow sections and tubular “T” sections.

6. The apparatus of claim 1, wherein the support frame is comprised of polyvinyl chloride (PVC) tubes, joints, and elbows.

7. The apparatus of claim 1, wherein the support frame is comprised of aluminum tubes, joints, and elbows.

8. An apparatus, comprising:

a multi-configuration portable mining machine, including:

a first stage, comprising:

a first jig cell having a first hutch with a first discharge opening, a first classifying screen disposed within the first hutch, and a first diaphragm coupled to the first hutch, the first discharge opening protruding through the first diaphragm; and a first rocker arm arranged to alternately push and pull on the first diaphragm;

a second stage disposed below the first stage, the second stage comprising:

a second jig cell having a second hutch with a second discharge opening, a second classifying screen disposed within the second hutch, and a second diaphragm coupled to the second hutch, the second discharge opening protruding through the second diaphragm, and the first discharge opening arranged to empty into the second hutch; and a second rocker arm arranged to alternately push and pull on the second diaphragm; and a first drive link coupling the second rocker arm to the first rocker arm.

9. The apparatus of claim 8, further comprising a support frame coupled to the first jig cell and the second jig cell, the support frame being configurable to arrange the first jig cell and the second jig cell from a first multi-stage cascade configuration into a second side-by-side configuration.

10. The apparatus of claim 8, further comprising a motor coupled to the first drive link and arranged to pivot the first rocker arm and the second rocker arm.

11. The apparatus of claim 10, further comprising a second drive link coupling the motor to the first rocker arm.

12. The apparatus of claim 8, further comprising a third jig cell disposed side-by-side to the first jig cell at the first stage, the third jig cell having a third hutch and a third discharge opening.

13. The apparatus of claim 12, wherein the third discharge opening is arranged to empty into the second hutch.

14. The apparatus of claim 12, wherein the first rocker arm is arranged to alternately push and pull on a third diaphragm coupled to the third hutch.

15. The apparatus of claim 8, further comprising a receiver disposed beneath the first discharge opening and above the second hutch, the receiver comprised of at least two chute-shaped receiver portions coupled together to allow the at least two receiver portions to be pivotally adjusted one to the other.

16. The apparatus of claim 8, wherein a pitch of the second classifying screen is finer than a pitch of the first classifying screen.

17. An apparatus, comprising:

a multi-configuration portable mining machine, including:

a first jig cell having a first hutch with a first discharge opening, a first classifying screen disposed within the first hutch, and a first diaphragm;

a second jig cell having a second hutch with a second discharge opening, a second classifying screen disposed within the second hutch, and a second diaphragm;

a water manifold arranged to distribute water into the first hutch and into the second hutch;

a motor configured to push and pull on the first diaphragm and the second diaphragm via at least one rocker arm; and a support frame coupled to the first jig cell, the second jig cell, and the motor, the support frame being configurable to arrange the first jig cell and the second jig cell in a first side-by-side configuration and to arrange the first jig cell and the second jig cell in a second multi-stage cascade configuration.

18. The apparatus of claim 17, wherein the first jig cell and the second jig cell are arranged in the first side-by-side configuration, and further comprising a third jig cell disposed beneath the first jig cell and the second jig cell, the third jig cell having a third hutch with a third discharge opening, a third classifying screen disposed within the third hutch, and a third diaphragm.

19. The apparatus of claim 18, wherein the first discharge opening and the second discharge opening empty into the third hutch.

20. The apparatus of claim 19, wherein the motor is arranged to drive the first diaphragm, the second diaphragm, and the third diaphragm via one or more drive links.

* * * * *